United States Patent [19]
Kirchgessner

[11] 3,779,634
[45] Dec. 18, 1973

[54] PORTABLE VIEWING THEATER

[75] Inventor: Robert W. Kirchgessner, Dayton, Ohio

[73] Assignee: Applied Communication Inc., Dayton, Ohio

[22] Filed: Oct. 13, 1971

[21] Appl. No.: 188,972

[52] U.S. Cl. .................. 353/17, 353/78, 353/119
[51] Int. Cl.. G03b 31/06, G03b 21/30, G03b 21/10
[58] Field of Search ...... 353/74–78, 119, 122, 15–19

[56] References Cited
UNITED STATES PATENTS

| | | | |
|---|---|---|---|
| 3,536,390 | 10/1970 | Dine | 353/78 |
| 3,560,088 | 2/1971 | Schwartz | 353/78 |
| 3,477,783 | 11/1969 | McCasland | 353/78 |
| 2,139,152 | 12/1938 | Freimann | 353/17 |
| 3,180,213 | 4/1965 | Parker | 353/17 |
| 3,187,626 | 6/1965 | Mindell | 353/15 |
| 3,304,836 | 2/1967 | Wolf | 353/17 |
| 2,506,169 | 5/1950 | Perillo | 353/119 |
| 3,455,631 | 8/1969 | Martinez | 353/122 |

Primary Examiner—Louis R. Prince
Assistant Examiner—A. J. Mirabito
Attorney—William R. Jacox et al.

[57] ABSTRACT

A portable compact case includes a rectangular box-like base section and a set of two cover members which seat on the base section and define corresponding front and rear compartments. A standard carousel-type film slide projector is positioned within the rear compartment, and a collapsible viewing hood assembly is located within the front compartment. The front compartment also encloses a standard cassette-type tape recorder in addition to an electronic synchronizing unit which controls the advancement of the slide projector in response to inaudible signals on the tape cassette. The recorder is removable from the front compartment through a door opening within the front wall of the case, and a speaker is positioned adjacent the front wall in back of an adjustable mirror. The viewing hood is formed from a substantially rigid sheet of plastics material and includes a set of side panels which are connected by an integral hinge to a top panel connected by an integral hinge to a rear panel which, in turn, is connected by an integral hinge to a flange secured to a base control panel mounted within the front compartment of the case. The hood assembly also includes a second mirror and a rear projection viewing screen which is removable for projecting onto a remote viewing screen. The rear projection screen is normally stored within the cover member for the front compartment.

11 Claims, 6 Drawing Figures

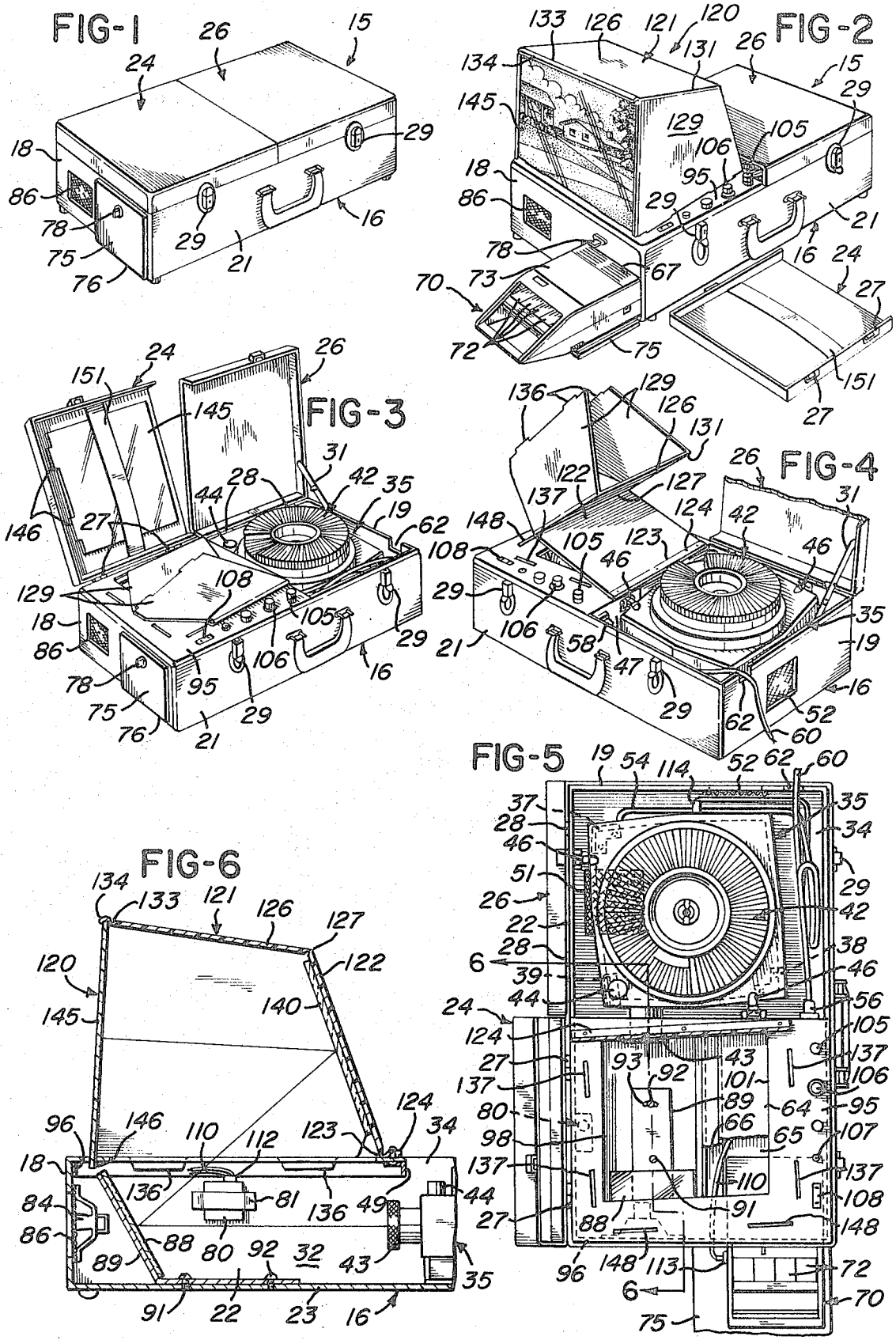

PORTABLE VIEWING THEATER

BACKGROUND OF THE INVENTION

In the audio-visual industry, many various forms of audio-visual viewing devices have been constructed or proposed for showing a visual program which is operated in synchronism with an audio tape recording. Some of the devices are portable and incorporate rear projection viewing screens which are collapsible into a case approximately the size of a suitcase. For example, U.S. Pat. Nos. 3,028,790, 3,187,626 and No. 3,375,055 each disclose a collapsible audio-visual viewing apparatus wherein a film strip is advanced in synchronism with an audio tape recording. U.S. Pat. No. 3,477,783 shows another form of collapsible device for presenting an audio-visual program and which incorporates a conventional carousel-type slide projector and a conventional tape recorder.

It has been found desirable for a portable audio-visual apparatus to incorporate a conventional carousel-type slide projector as illustrated in above U.S. Pat. No. 3,477,783 and to provide for synchronizing the advancement of the slides with an audio presentation which has been recorded on a standard cassette-type tape recorder. The incorporation of such standard components enables the components to be serviced by any one of the many service people who are trained to service the components. It is also desirable to provide for convenient access to the projector and to the tape recorder after the viewing screen has been erected and a program has been started to provide for either adjusting the projector or recorder to obtain precise synchronism or for resetting the projector and recorder to corresponding starting positions. In addition, it is desirable to provide for conveniently collapsing the viewing screen assembly and to provide for enclosing the projector during the presentation of a program for minimizing the background noise produced by operation of the projector.

SUMMARY OF THE INVENTION

The present invention is directed to an improved compact portable audio-visual theater which provides all of the above desirable features and, in addition, is convenient to set up and operate. That is, a portable theater of the invention provides for a compace assembly of a standard carousel-type slide projector and a standard cassette-type audio tape recorder, each of which can be easily and quickly removed for independent use. The compact portable theater of the invention also provide an electronic control unit which synchronizes the operation of the slide projector with the operation of the cassette recorder.

In accordance with one embodiment of the invention, a portable theater includes a rectangular case having a box-like base section which is covered by two separate lid or cover members hinged to one side of the base section. The cover members cooperate with the base section to define corresponding front and rear compartments which are arranged in tandem relation longtiudinally of the case. A carousel-type slide projector is positioned by brackets within the rear compartment and has its projecting lens directed toward an adjustable mirror located within the front compartment adjacent a speaker mounted on the front wall of the case. The front compartment of the case also encloses a housing which defines a chamber having an opening within the front wall of the case for receiving a conventional cassette-type tape recorder. A door is pivotally mounted on the front wall and normally covers the front opening of the chamber for retaining the tape recorder.

A collapsible viewing hood assembly is also positioned within the front compartment and includes a deck or base control panel on which are mounted the electrical controls for operating the theater. The hood assembly further includes a rear projection viewing screen and a second mirror which are supported by a hood formed from a sheet of thermoplastics material. The hood includes a pair of side panels integrally hinged to a top panel which is integrally hinged to a rear panel. The rear panel is connected by an integral hinge to a flange which is secured to the base control panel so that the side, top and rear panels are collapsible to generally flat overlapping positions resting on the base panel. The viewing screen is removable from the hood assembly and is normally stored within the cover member for the front compartment.

Other features and advantages of the invention will be apparent from the following description, the accompanying drawing and the appended claims.

BRIEF DESCRIPTION OF THE DRAWING

FIG. 1 is a perspective view of a portable theater constructed in accordance with the invention and illustrating its condition for transporting;

FIG. 2 is a perspective view of the theater in use with the viewing hood assembly erected and the cassette recorder extended;

FIG. 3 is another perspective view of the theater shown in FIGS. 1 and 2 and illustrating the cover members in their open positions and the viewing hood assembly in its collapsed position;

FIG. 4 is another perspective view showing the hood assembly as it is being erected;

FIG. 5 is a plan view of the theater with the cover members removed and hood assembly broken away; and FIG. 6 is a fragmentary vertical section taken generally on the line 6—6 of FIG. 5.

DESCRIPTION OF THE PREFERRED EMBODIMENT

Referring to FIG. 1, a portable audio-visual theater includes a rectangular case 15 having dimensions approximately the same as a small suitcase. The case 15 is formed by a box-like base section 16 having a front wall 18 and a rear wall 19 rigidly connected by parallel side walls 21 and 22 and a bottom wall 23. The case 15 also includes a set of cap-like mating cover sections or members 24 and 26 each of which is pivotally connected to the base section 16 by corresponding pairs of hinges 27 and 28. The hinges 27 provide for removing the cover member 24 during use of the theater as illustrated in FIG. 2. A set of latches 29 provide for securing the cover members 24 and 26 to the base section 16, and a foldable brace 31 is pivotally connected to the rear cover members 26 and the rear wall 19 of the base section 16 to support the rear cover member 26 in its open position as shown in FIG. 3. The cover members 24 and 26 cooperate with the base section 16 to define corresponding front and rear compartments 32 and 34, respectively.

A carousel-type film slide projector 35 is located within the rear compartment 34 and is retained in a predetermined position by a set of right angle corner brackets 37 and 38 and an L-shaped bracket 39 all of which are secured by rivots to the bottom wall 23 of the case 15. Preferably, the projector 35 is one which is manufactured by the Eastman Kodak Company, Rochester, New York, and includes a rotary slide tray 42 and a laterally offset lens 43 having a focal adjustment knob 44. The projector 35 is retained or secured in the positioning brackets 37-39 by a pair of overcenter spring clips 46, one of which is mounted on the side wall 22 and the other of which is mounted on an angle bracket 47 (FIG. 4) extending from the side wall 21 adjacent an angular cross member 49 (FIG. 6) rigidly connecting the side walls 21 and 22 between the front compartment 32 and the rear compartment 34.

The slide projector 35 incorporates an internal blower which receives cooling air through a screened opening 51 (FIG. 5) within the bottom wall 23 of the case and discharges the air through a screen opening 52 (FIG. 4) within the rear wall 19 of the case. As shown in FIG. 5, the slide projector 35 has a power supply cord 54 which is coiled and stored within the rear compartment 34. The cord 54 includes a plug 56 which is inserted into an electrical outlet 58 supported by the angle bracket 47 extending from the side wall 21 adjacent the cross brace 49. A main power supply cord 60 extends from a strain relief mounted on the bracket 47 and is normally stored within the compartment 34 with the cord 54. A notch 62 is formed within the rear wall 19 of the base section 16 and is adapted to receive the main power supply cord 60 when the cord is extended to a suitable power supply source. Thus the notch 62 enables the rear cover member 26 to be closed (FIG. 2) when the slide projector 35 is operating.

A housing 64 (FIG. 5) is located within the front left corner of the front compartment 32 and cooperates with the bottom wall 23 to define a generally rectangular chamber 65 and a connecting channel 66 (FIG. 5). Preferably, the housing 64 is formed by folding a rigid sheet of thermoplastics material and includes flanges (not shown) which are secured to the front wall 18, the side wall 21 and bottom wall 23 by a series of rivots.

The chamber 64 and channel 66 have an opening 67 (FIG. 2) within the front wall 18 and are adapted to receive a conventional single track cassette-type tape recorder 70 such as the model RQ 209 B manufactured by the Panasonic Corporation. This particular tape recorder generally includes a series of depressable control buttons 72 and a hinge cover 73 which encloses a standard Norelco-type single track tape cassette. The cassette tape recorder 70 may also be of the dual track or stereo type if desired. As shown in FIG. 3, the recorder 70 is retained within the chamber 65 by a door 75 which is connected by a lower hinge 76 to the front wall 18. The door 75 is movable between the horizontal open position (FIG. 2) and a vertical closed position (FIG. 3) where the door 75 is retained by a twist-type latch 78.

An electronic synchronizing unit 80 (FIG. 6) is located within the front compartment 32 and is secured to the inner surface of the side wall 22 by an elastic band 81. An audio speaker 84 is mounted on the inner surface of the front wall 18 in back of a screened opening 86 (FIG. 3) within the front wall 18. The front compartment 32 also encloses a mirror 88 which is supported in an inclined position by an angle bracket 89 connected to the bottom wall 23 by a screw 91 (FIG. 5) and a screw 92 which extends through an arcuate slot 93. The bracket 89 is pivotable on the axis of the screw 91 when the screw 92 is loosed to provide for adjusting the angle of the mirror 88 relative to the lens 43 of the projector 35.

A base control panel 95 (FIG. 5) is mounted on the cross brace 49 and on a U-shaped metal frame 96 which is secured by rivots to the front and side walls of the base section 16 within the front compartment 32. The base panel 95 has a generally rectangular opening 98 which provides access to the adjusting screw 92 and support bracket 89 for the mirror 88. The base panel 95 also includes a lip portion 101 which projects downwardly to the upper wall of the tape recorder housing 64. The left portion of the base panel 95 adjacent the side wall 21, also serves to support controls for operating the theater, including a main on-off switch 105 and a volume control rheostat 106. The base panel 95 also supports a jack 107 for a remote speaker and an auxiliary 110 volt electrical outlet 108.

The power supply cord 60, switch 105, volume control rheostat 106, jack 107 and the outlets 58 and 108 are all connected by an electrical wiring harness, generally indicated at 110, to the synchronizing unit 80, the audio-speaker 84, the tape recorder 70 and the slide projector 35 so that the step-by-step advancement of the slide tray 42 of the projector 35 is controlled by inaudible pulses or signals which are prerecorded on the tape cassette of the recorder 70. Preferably, the wiring harness 110 includes a plug 112 (FIG. 6) forming the connection with the synchronizing unit 80, a plug 113 which is inserted into the "monitor" jack of the cassette tape recorder 70 and another plug 114 which is inserted into the remote control jack of the slide projector 35. When the plug 113 is inserted into the "monitor" jack of the tape recorder 70, the speaker on the tape recorder is blocked out and is replaced by the speaker 84.

A viewing hood assembly 120 is mounted on the base panel 95 within the front compartment 32 and is movable between a collapsed position (FIG. 3) and an elevated or erected position (FIG. 2). The hood assembly 120 includes a box-like hood 121 which is formed from a substantially rigid sheet of thermoplastics material. The hood 121 includes a rear or back panel 122 connected by an integral hinge 123 to a flange 124 which is rigidly secured by a set of rivets (not shown) to the cross brace 49 with the rear edge portion of the base panel 95 sandwiched therebetween (FIG. 6). A flat top panel 126 is connected by an integral hinge 127 to the back panel 122, and a set of side panels 129 are connected by corresponding integral hinges 131 to opposite edges of the top panel 126. An integral hinge 133 (FIG. 6) connects the forward edge of the top panel 126 to a projecting lip portion 134.

Each of the side panels 129 includes a set of projecting tabs 136 (FIG. 4) which are adapted to be inserted into corresponding slots 137 formed within the base panel 95 when the hood assembly 120 is moved to its erected position. In this position, the back panel 122 rests upon the rearward sloping edges of the side panels 129 and thereby precisely positions the back panel 122 at a predetermined acute angle with respect to the base panel 95.

A second mirror 140 (FIG. 6) is secured by adhesive to the inner surface of the back panel 122 and cooperates with the mirror 88 to reflect images from the projector lens 43 to the back surface of a rear projection viewing screen 145 forming the front wall of the collapsible hood assembly 120. The upper edge of the viewing screen 145 snaps under the lip portion 134, and the lower portion of the screen 145 includes a set of tabs 146 (FIG. 3) which project downwardly into corresponding slots 148 formed within the forward portion of the base panel 95. As shown in FIG. 3, the removable viewing screen 145 is adapted to be stored within the cover member 24 for the front compartment 32 of the case 15 and is retained within the cover member by an elastic band 151 having its ends secured by staples to the inner surface of the front cover member 24.

When the viewing hood assembly 120 is in its collapsed position shown in FIG. 3, the side edge portions of the mirror 140 rests upon the side edge portions of the base panel 95 and thus are confined between the base panel 95 and the back panel 122 of the hood assembly. The top panel 126 folds rearwardly onto the back panel 122, and the side panels 129 fold inwardly into overlapping relation on the inner surface of the top panel 126. While the viewing screw 145 is preferably removable, the upper edge portion of the screen 145 could be hinged to the forward edge of the top panel 126 so that the screen 145 would fold onto the top panel 126 either before or after the side panels 129.

When the portable theater is used for presenting an audio-visual program, a set of 35 millimeter slides are placed within the slide tray 42 which is rotated to its starting position. An audio program is recorded on a tape cassette, and an inaudible 50 c.p.s. pulse or signal is recorded on the magnetic tape whenever it is desired to advance the slide tray 42 by one slide. The recorded tape cassette is then inserted into the battery operated tape recorder 70.

After the portable theater is positioned on a table or desk at the location where the program is to be presented, the front cover member 24 is released and removed from the base section 16. The hood assembly 120 is erected simply by gripping the side panels 129 and pivoting all of the hood panels to their corresponding positions shown in FIG. 2. The viewing screen 145 is then removed from the front cover member 24, and the lower tabs 146 are inserted into the slots 148 after which the upper edge of the screen 145 is snapped under the lip portion 134. The door 75 is opened, and the tape recorder 70 is partially withdrawn from its storage chamber 65 as shown in FIG. 2.

After the power cord 60 is connected to a suitable power supply, the switch 105 is moved to its on position so that the projecting lamp and the air cooling blower of the slide projector 35 are energized. The presentation of the audio-visual program is started by depressing the "play" button 72 of the tape recorder 70. During the presentation of the program, the rear cover member 26 is closed as illustrated in FIG. 2. After the program is completed, the "stop" button 72 of the tape recorder 70 is depressed thereby terminating the advancement of the slide tray 42 of the projector 35. If desired, the recorder 70 may be operated from the 110 V power supply by connecting a power supply cord from the recorder 70 to the outlet 108.

From the drawing and the above description, it is apparent that a portable audio-visual theater constructed in accordance with the invention provides desirable features and advantages. For example, the theater of the invention provides for using a standard slide projector in addition to a standard cassette-type tape recorder and for arranging and locating the components in a compact manner so that the components may be conveniently and easily transported.

Another important feature is provided by the convenient access to both the slide projector 35 and the tape recorder 70. That is, the door 75 in the front wall 18 provdes for partially removing the tape recorder 70 so that the presentation of an audio-visual program may be controlled simply by depressing the push button 72 of the recorder 70. Furthermore, the tape recorder 70 may be completely removed from the case 15 simply by retracting the plug 113 which extends into the "monitor" jack of the tape recorder 70 and is normally received within the channel 66. The slide projector 35 may be conveniently removed from the case 15 simply by releasing the spring retaining clips 46, removing the plug 56 from the receptacle 58 and removing the plug 114 from the remote control jack on the slide projector 35. As mentioned above, the rear cover member 26 may be closed during operation of the theater so that the slide projector 35 is completely enclosed within the rear compartment 34, and the blower and operating noise is primarily confined within the rear compartment.

The simplified construction of the viewing hood assembly 120 also provides important advantages. That is, the top, back and side panels in addition to the flange 124 and the lip portion 134 are constructed from a single sheet of thermoplastic material, simple by die cutting the sheet and engaging the sheet with heated knives or blades to form the integral hinges 123, 127, 131 and 133. Furthermore, the arrangement and connection of the side, top and back panels of the hood assembly 120 provide for conveniently and quickly collapsing and erecting the hood assembly between its generally flat collapsed position shown in FIG. 3 and its erected position shown in FIG. 2.

While the form of viewing apparatus herein described constitutes a preferred embodiment of the invention, it is to be understood that the invention is not limited to this precise form of apparatus, and that changes may be made therein without departing from the scope and spirit of the invention.

The invention having been described, the following is claimed:

1. A portable theater comprising an elongated box-like case including a base section defining a front compartment and a rear compartment arranged in longitudinally disposed tandem relation, a film projector positioned within said rear compartment and having a projecting lens directed toward said front compartment, a viewing hood assembly including a rear projection viewing screen, said hood assembly being movable between a collapsed position within said front compartment and an erected position projecting above said front compartment, mirror means within said front compartment and being positioned to reflect an image from said projecting lens to said viewing screen when said hood assembly is in said erected position, separate cover sections for said front and rear compartments and being movable independently between corresponding open and closed positions, said cover section or said front compartment being effective in said closed position to cover said hood assembly in said collapsed position, and said cover section for said rear compartment being movable to said closed position when said cover section for said front compartment is in said open position and said hood assembly is in its erected position.

2. A portable theater as defined in claim 1 wherein said viewing screen is removable from said hood assembly, mand means on said front cover section for retaining said viewing screen in a stored position.

3. A portable theater as defined in claim 1 wherein said hood assembly comprises a top panel, a pair of side panels and a rear panel, first hinge means connected said rear panel to said base section of said case, second hinge means connecting said top panel to said rear panel, and third hinge means connecting said side panels to said top panel to provide for conveniently moving said hood assembly between said erected and collapsed positions.

4. A portable theater as defined in claim 3 wherein said panels comprise an integral sheet of a plastics material, and said second and third hinge means each comprises an integral hinge connecting the corresponding said panels.

5. A portable theater as defined in claim 3 wherein said hood assembly further includes a base panel disposed within said front compartment of said case and mounted on said base section, means defining a plurality of slots within said base panel, and said side panels include a plurality of projecting tabs adapted to be inserted into said slots when said hood assembly is moved to said erected position.

6. A portable theater as defined in claim 1 wherein said base section of said case includes front, rear and side walls, means for receiving and retaining an audio tape recorder within said base section of said case, means defining an opening within one of said walls of said front compartment of said base section to provide at least partial removal of said recorder from said base section, and movable door means mounted on said base section of said case for covering said opening to retain said recorder.

7. A portable theater as define in claim 6 wherein said opening is formed within said front wall, and said receiving and retaining means for said recorder is located within said front compartment.

8. A portable theater as defined in claim 1 wherein said viewing hood assembly is oriented at a slight acute angle with respect to said base section of said case for accommodating a projector having an offset projecting lens.

9. A portable theater as defined in claim 1 wherein said base section has a front wall, means defining an opening within said front wall for receiving a cassette-type audio tape recorder, and means within said front compartment for retaining said recorder in a stored position when said theater is being transported.

10. A portable theater as defined in claim 1 including a base panel supported within said front compartment and supporting said hood assembly in its collapsed position, and control means supported by said base panel laterally outboard of said hood assembly in said erected position.

11. A portable theater comprising an elongated rectangular case including a rigid box-like base section having front and rear walls connecteed by opposite side walls and a bottom wall to define front and rear longitudinally disposed tandem compartments within said case, a set of front and rear cover members seated on said base section and movable independently between corresponding open and closed positions, a film projector positioned within said rear compartment and having a projecting lens directed toward said front compartment, a viewing hood assembly within said front compartment and including a first mirror and a rear projection viewing screen, said hood assembly being movable between a collapsed position within said front compartment and an erected position above said front compartment, a second mirror within said front compartment and cooperating with said first mirror to reflect an image from said lens of said projector to said viewing screen after said hood assembly is moved to said erected position, means for retaining an audio tape recorder within said front compartment, an opening within one of said walls for said front compartment and providing for at least partial removement of said recorder from said front compartment when the corresponding said cover member is in its closed position, and closure means for closing said opening when said recorder is retracted into said front compartment.

* * * * *